(12) United States Patent
Silberberg

(10) Patent No.: US 7,237,716 B2
(45) Date of Patent: *Jul. 3, 2007

(54) PARKING SYSTEM FOR SENDING MESSAGES

(75) Inventor: Michael E Silberberg, South Melbourne (AU)

(73) Assignee: CDS Worldwide Pty Ltd., South Melbourne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 10/704,107

(22) Filed: Nov. 7, 2003

(65) Prior Publication Data

US 2004/0094619 A1    May 20, 2004

Related U.S. Application Data

(63) Continuation-in-part of application No. 10/204,834, filed on Aug. 23, 2002, now Pat. No. 6,889,899.

(30) Foreign Application Priority Data

Feb. 24, 2000    (AU) ..................... PQ5836

(51) Int. Cl.
*G06K 13/06* (2006.01)

(52) U.S. Cl. ............... 235/384; 235/375; 705/418

(58) Field of Classification Search ............ 235/384, 235/380, 379, 375; 705/418; 194/217, 902
See application file for complete search history.

(56) References Cited

U.S. PATENT DOCUMENTS

| | | | |
|---|---|---|---|
| 5,155,614 A | 10/1992 | Carmen et al. | |
| 5,351,187 A | 9/1994 | Hassett | |
| 5,617,942 A | 4/1997 | Ward, II et al. | |
| 5,642,119 A | 6/1997 | Jacobs | |
| 5,648,906 A | 7/1997 | Amirpanahi | |
| 5,737,710 A | 4/1998 | Anthonyson | |
| 5,841,369 A | 11/1998 | Sutton et al. | |
| 6,312,152 B2 | 11/2001 | Dee et al. | |

FOREIGN PATENT DOCUMENTS

| | | |
|---|---|---|
| DE | 198 28 951 | 1/2000 |
| GB | 2 033 696 | 10/1979 |
| WO | WO 96/27170 | 9/1996 |
| WO | WO 96/34366 | 10/1996 |
| WO | WO 97/13222 | 4/1997 |
| WO | WO 98/04080 | 1/1998 |
| WO | WO 99/48062 | 9/1999 |
| WO | WO 00/11616 | 3/2000 |

*Primary Examiner*—Karl D. Frech
(74) *Attorney, Agent, or Firm*—Michael Best & Friedrich

(57) ABSTRACT

The present invention provides a parking system having a parking meter in close proximity to a corresponding parking bay in which a user's vehicle is able to be parked. A payment receiving means is further provided for receiving payment and thereafter establishing a parking period in which the vehicle is able to be legitimately parked in the bay. There is provided a communication means for sending a message to the user's mobile phone prior to the expiry of the parking period. The message alerts the user that the parking period will soon expire and that the user must either move the vehicle before the expiry of the parking period or make an additional payment, if allowable, to remain legitimately parked.

30 Claims, 2 Drawing Sheets

PARKING SYSTEM FOR SENDING MESSAGES

REFERENCE TO PRIOR APPLICATION

This application is a continuation-in-part of application Ser. No. 10/204,834, filed Aug. 23, 2002, now U.S. Pat. No. 6,889,899 issued May 10, 2005, which is a national stage filing of International Patent Appl. No. PCT/AU01/00192, filed Feb. 23, 2001. Priority is hereby claimed to U.S. patent application Ser. No. 10/204,834 filed on Aug. 23, 2002 (now U.S. Pat. No. 6,889,899 issued on May 10, 2005), to International Patent App. No. PCT/AU01/00192 filed on Feb. 23, 2001, and to Australian Patent Appl. No. PQ 5836 filed on Feb. 24, 2000, the entire contents of which are incorporated herein by reference.

FIELD OF THE INVENTION

The present invention relates to a parking system for sending messages to a receiver via a wireless communication link.

BACKGROUND OF THE INVENTION

With population growth on the increase, the infrastructure of many large cities is under strain. The amount of vehicle parking is often at a premium and parking systems can be employed to regulate parking availability wherein users are charged a fee which is generally related to the amount of time their vehicle is parked in a given parking area. Parking systems are commonly used to regulate parking availability for metered parking and car parks.

AU 01/00192 discloses a parking system used for regulating metered parking wherein a meter is situated in close proximity to a corresponding parking bay. When a user's vehicle is parked, the user is generally required to pay a fee at the meter corresponding to the amount of time in which the user estimates that parking will be required. Once paid, the user effectively establishes an account.

Upon expiry of the account, the user may be subject to receiving a fine issued by a law enforcement officer if the vehicle remains parked within the parking bay regulated by the parking system. The account can be "topped up" by the user periodically, however, there is often a maximum allowable tim limit permitted for parking a vehicle in a given parking bay. Exceeding this limit could also undesirably result in the user being issued with a parking fine.

AU 03/00457 discloses a parking system for regulating parking in a car park comprising a plurality of parking spaces in which a vehicle can park. A user is issued with an account when initially parking and, in contrast to metered parking, the account time balance increases over time. The user is then charged a fee when exiting the car park which generally corresponds to the amount of time in which the user is parked within the car park.

WO 01/73701 discloses a method wherein a user may initiate a call from a mobile phone to a parking system and, when connected, check the credit balance linked to their pre-paid account. The onus is therefore undesirably on the user to check their credit balance and hence time remaining for a vehicle to be legitimately parked in a car park.

SUMMARY OF INVENTION

According to one aspect of the present invention, there is provided a parking system comprising:

- a parking meter for location in close proximity to a corresponding parking bay in which a user's vehicle is able to be parked;
- a payment receiving means for receiving payment and thereafter establishing a parking period in which the vehicle is able to be legitimately parked in the bay;
- a communication means for sending a message to the user's mobile phone prior to the expiry of the parking period, said message alerting the user that the parking period will soon expire and that the user must either move the vehicle before the expiry of the parking period or make an additional payment, if allowable, to remain legitimately parked.

Preferably, the payment receiving means comprises at least one of:
- a coin receipt means for accepting coinage;
- a note receipt means for accepting notes;
- a card reader for receiving credit card or smart card payments; and/or
- a receiver for receiving a mobile telephone call wherein the user can pay electronically using the mobile telephone.

Preferably, the parking meter has an input pad for entering a user's mobile telephone number.

Preferably, the parking system includes a processor for:
- storing a mobile telephone number provided by the user;
- calculating the parking period based on the payment received; and
- compiling the message to be sent.

Even more preferably, compiling the message involves retrieving a message and the user's mobile telephone number from a storage medium.

Preferably, the message is a short text message (SMS) message.

According to a further aspect of the present invention, there is provided a parking system for sending messages to a receiver via a wireless communication link comprising:

- a timer means for establishing when a pre-determined time condition is met for a user's vehicle parked within a parking area regulated by said parking system, said user having an account which is linked to said receiver; and
- a communication means for sending a message to said receiver when said pre-determined time condition is met and said user's vehicle remains parked within said parking area.

Preferably, said parking area is a parking bay in which said vehicle can park, said parking bay being in close proximity to a corresponding parking meter.

Alternatively, said parking area is a car park comprising a plurality of parking spaces in which said vehicle can park.

Preferably, said receiver is a mobile telephone and said account has a record of said mobile telephone's number thereby linking said account to said mobile telephone.

BRIEF DESCRIPTION OF THE DRAWINGS

A preferred embodiment of the invention will now be described, by way of example, with reference to the accompanying drawings, wherein.

DESCRIPTION OF THE PREFERRED EMBODIMENT

To facilitate with the understanding of the ensuing first embodiment described, the disclosure of AU 01/00192 can be considered to be incorporated herein by reference.

Figure 1:
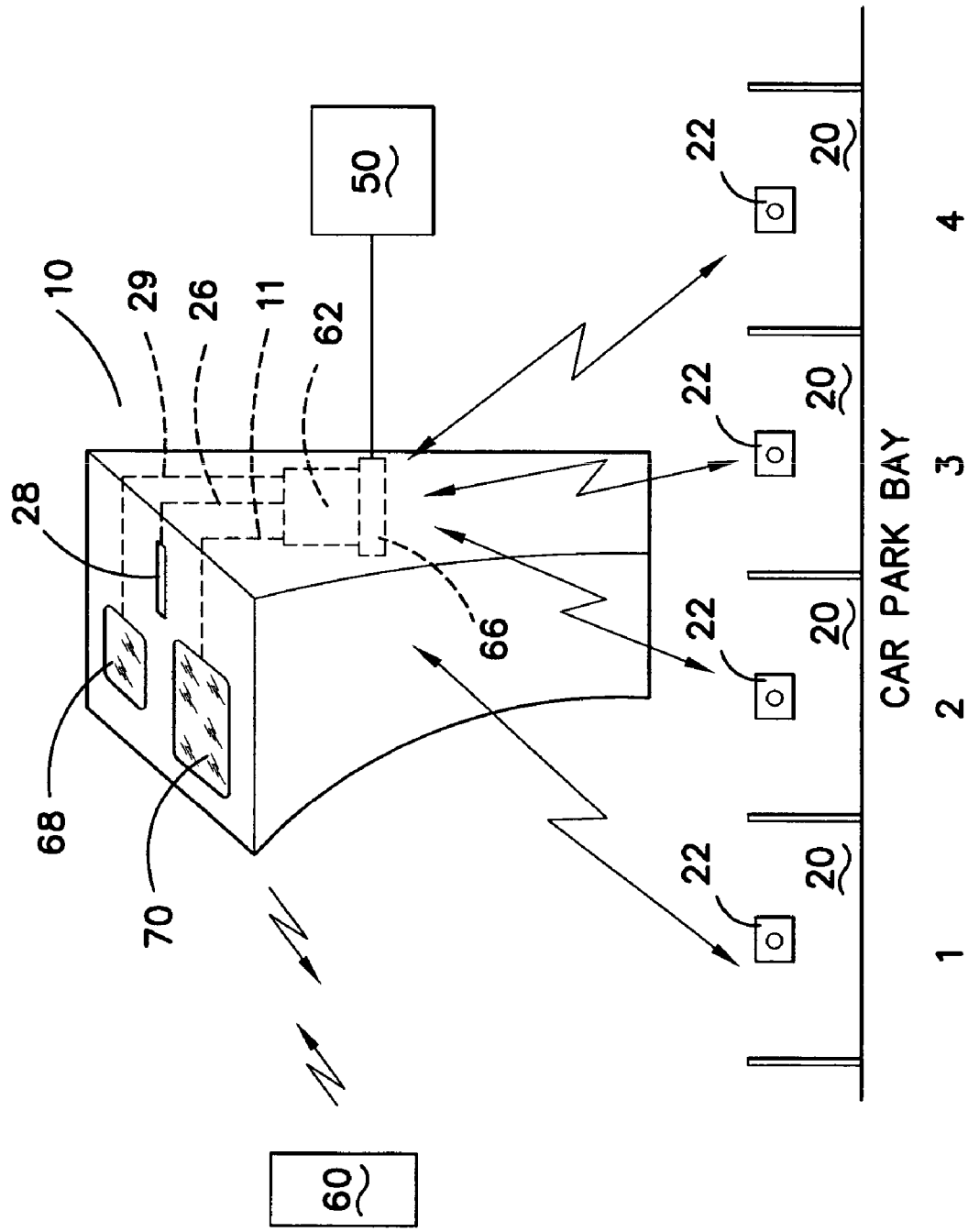
FIG. 1 is a schematic diagram of a parking system used for regulating metered parking according to a first embodiment of the present invention.

According to a first embodiment of the present invention, there is provided a parking system for regulating metered parking as shown in FIG. 1. There are provided four parking bays 20, numbered car park bay 1 to 4, each having a corresponding sensor 22 which is able to detect when a vehicle is parked in a bay 20. A parking meter 10 regulates parking for each of the four bays 20 and is connected to a central station 50 in a remote location. Each sensor 22 can transmit data regarding the presence of a vehicle in the parking bay 20 to the parking meter 10. The parking system would typically include a plurality of meters 10 connected to the central station 50, however, only a single meter 10 regulating parking in a single parking bay 20 will be considered herein.

The parking meter 10 includes a processor 62 which interfaces to a first transceiver (not shown) for transmitting and receiving telephone calls to and from a mobile telephone 60 respectively. A second transceiver 66 is also connected to the processor 62 for transmitting and receiving information to and from the central station 50 respectively via a mobile telephone network, fixed land line network or another communication link such as the Internet. The central station 50 has a computer system for recording transactions and outputting information to each of the parking meters 10. Each of the parking meters 10 have a unique identifying telephone number which can be dialled by the central station 50 so that information can be transmitted from the central station 50 to the second transceiver 66 associated with a parking meter 10. The user can also connect to the central station 50 via a parking meter 10 by using their mobile telephone 60 to dial the unique identifying telephone number of the parking meter 10.

The parking meter 10 has a display 68 for displaying information to the user which interfaces to the processor 62 via line 29. An input pad 70 is provided for allowing the user to input information to the processor 62 via line 11. The input pad 70 is typically a keypad or touch screen display. A payment receiving means 28 is also provided to allow the user to pay for a parking period in which the vehicle may be legitimately parked within a parking bay 20. The payment receiving means 28 interfaces to the processor 62 via line 26.

Once the user has parked their vehicle in the bay, they then proceed to pay a fee which generally corresponds to the amount of time in which the user estimates that parking will be required. Once paid, the user establishes an account credited with a time balance which decreases over time. Payment of the fee may be undertaken in a variety of ways using the payment receiving means 28. The payment receiving means 28 includes any combination of a coin receipt means wherein the user can provide coins in a first slot; a note receipt means wherein the user can provide bank notes in a second slot; a card reader for receiving and reading the magnetic strip on a credit card or other system specific smart card; and/or the first transceiver for receiving a mobile telephone call wherein the user can pay electronically, using their mobile telephone 60 to dial the unique identifying telephone number of the meter 10 and, when connected, further providing credit card details or a pre-paid account identification number to the meter 10 via the mobile telephone 60.

The central station 50 may also have analogous means for making fee payments which additionally form part of the payment receiving means 28. The payment receiving means 28 can accept payment from either one or a plurality of the foregoing means for accepting payment. Once a fee is paid, the payment receiving means 28 communicates the amount paid to the processor 62 which establishes a user account and calculates a corresponding credited time balance corresponding to the allowed parking period. The processor 62 proceeds to periodically update the time balance as time passes.

The parking system is adapted to send reminder messages to the mobile telephone 60 via the first transceiver. If payment is made using the mobile telephone 60, the user's mobile telephone number is stored and linked to the user's account by the processor 62. Alternatively, the user can input their mobile phone number to the parking system via the input pad 70 if they wish to receive reminder messages from the parking system. Account details including the user's mobile phone number are typically stored in a suitable storage medium by the processor 62. Plus, the user's mobile telephone number can be entered into the processor 62 or the central station 50 by receipt of date relating to that number if parking is initiated by a mobile telephone call. Alternatively, if payment is made without the use of the mobile telephone by means of coin payment, credit card payment or note payment via the receiving means 28, the user can type his or her mobile telephone number into the input keypad 70 so that information can be supplied to the processor 62 and/or central station 50.

Messages would generally only be sent to the user in the event that they have selected an option displayed on the display 68 by using the input pad 70 to enable this feature. For the ensuing description it can be assumed that this messaging feature has been enabled by the user. When a pre-determined time condition is met and the user's vehicle is parked in the parking bay 20, a corresponding message is compiled by the processor 62 or station 50 and sent to the user's mobile telephone 60 via the first transceiver. Alternatively, the data can be supplied from the processor 62 to the central station 50 and the central station 50 can be responsible for sending the corresponding message to the user's mobil telephone 60.

The parking system has a communications means including the processor 62 and the first transceiver for transmitting and receiving telephone calls to and from the mobile telephone 60 respectively. In addition, the communication means can be used to transmit and receive short message service (SMS) messages to and from the mobile telephone 60 respectively. A message to be sent is compiled by the processor 62 or central station 50 which retrieves a SMS or pre-recorded voice message related to the particular pre-determined time condition from a storage medium. The processor 62 then retrieves the user's mobile telephone number from the user's account stored in the storage medium and sends the message to the user's mobile telephone 60 via the first transceiver.

Parking bays are typically governed by time dependant restrictions. There is a maximum allowable time limit imposed for parking a vehicle in the parking bay. This time limit may be subject to variation depending on the time of day or day of the week. In addition, the parking rate of charge may vary depending upon the time of day or day of the week. The parking system therefore has a timer means for (1) tracking the time of day, day of the week and date, and (2) monitoring the period that has elapsed since the user has parked their vehicle within the parking bay using information provided by the sensor 22.

The timer means includes a calendar and a clock for tracking the time of day and is typically located in the meter 10. The processor 62 also forms part of the timer means and monitors the period that has elapsed after the user parks their vehicle within the parking bay using information provided by the sensor 22. The sensor 22 would typically sense when the vehicle has parked in the parking bay and initiate a timer in the processor 62 when an account is established. The timer would then be stopped when the sensor 22 detects that the vehicle has left the parking bay.

Figure 2:
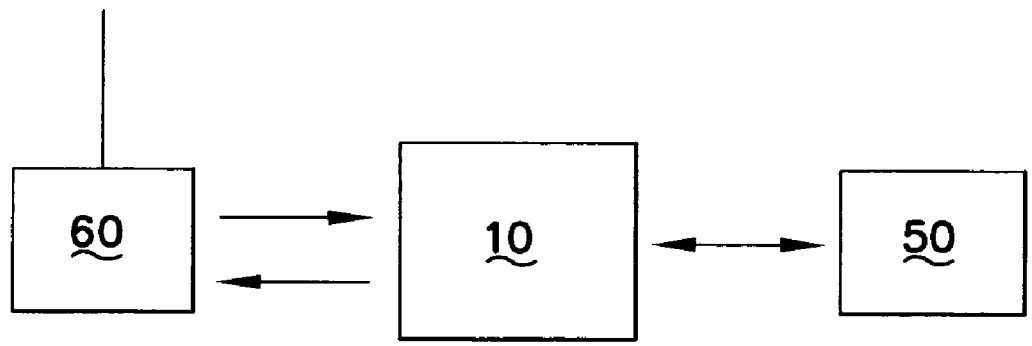
FIG. 2 is a block diagram of a parking system used for regulating metered parking according to a first embodiment of the present invention.

FIG. 2 shows a block diagram of the parking system including the meter 10 connected to the central station 50 wherein data can be relayed from the central station 50 to the meter 10 and visa versa. The user has a mobile telephone 60 which is linked via a wireless communication link to the parking system. Using the mobile telephone 60, the user can communicate directly with the meter 10 which, in turn, can communicate with the central station 50. The mobile phone 10 can transmit and receive calls from the meter 10 via the communication means.

According to a first example of the first embodiment of the present invention, a user parks their vehicle in a parking bay requiring a fee of $6 per hour and having a maximum allowable time limit for parking the vehicle in that parking bay of 1 hour. The user pays a fee of $3 and provides their mobile phone number to the meter 10, thereby establishing an account which is linked to the mobile telephone 60. The user can therefore remain legitimately parked in the parking bay for 30 minutes as the account has a credited time balance of 30 minutes which decreases over time.

The timer means is used to decrease the time balance over time and is continually updated on the display 68. A pre-determined time condition enforced by the parking system is met when the time balance decreases to less than a fixed period of 5 minutes before expiry. When this pre-determined time condition is met and the vehicle remains parked in the parking bay, the communication means sends a reminder message to the mobile telephone 60 alerting the user that only 5 minutes credit remains and that the parking period will soon expire. The user can return to their vehicle and move it from the parking bay before the expiry of the parking period or, alternatively, pay an additional fee thereby increasing the time balance of the account, to avoid receiving a parking fine.

The reminder message can be a pre-recorded voice message or a SMS message. The user can use their mobile phone to respond to the message with a return message, being either a SMS message or regular call, to the communication means for increasing the time balance of the time account. The user may increase or "top up" their limit by an additional 30 minutes up to the maximum allowable time limit for parking the vehicle in the parking bay of 1 hour.

The user pays an additional fee of $3 using the payment receiving means 28 which buys an additional 30 minutes parking time and therefore the vehicle can legitimately remain parked in the parking bay for up to 60 minutes from initially parking in the bay, which approximately corresponds to the time of establishing the account. Another pre-determined time condition enforced by the parking system is met when the vehicle has been parked in the parking bay for greater than a fixed period of 55 minutes.

When this pre-determined time condition is met and the vehicle remains parked in the parking bay, the communication means sends a reminder message to the mobile telephone 60 alerting the user that the maximum allowable time limit has almost expired. The user does not have the option to increase the time balance by paying an additional fee and instead must move the vehicle to avoid receiving a parking fine. If the maximum allowable time limit expires and the vehicle remains parked in the parking bay, additional reminder messages may be sent to the user at various fixed periods.

According to a second example of the first embodiment of the present invention, the vehicle is legitimately parked in a parking bay at 6:15 am and the parking bay turns into a clearway wherein no parking is permitted in that parking bay after 6:30 am. The maximum allowable time limit associated with the parking bay will therefore change at 6:30 am and affect the legitimacy of the parked vehicle. Another pre-determined time condition enforced by the parking system is met when the time of day is within a fixed period of 10 minutes before the pending change in the maximum allowable time limit. Therefore, in this example, the pre-determined time condition is met if the vehicle remains parked in the parking bay after 6:20 am. When the foregoing pre-determined time condition is met and the vehicle remains parked in the parking bay, the communication means sends a reminder message to the mobile telephone 60 alerting the user to move their vehicle.

According to a third example of the first embodiment of the present invention, the vehicle is parked in a parking bay requiring no fee at the time of parking, however, a prescribed maximum allowable time limit associated with the parking bay applies. In this event, the user may still establish an account linked to the mobile telephone 60 and be sent a reminder message when the vehicle has been parked in the parking bay for a period approaching the prescribed maximum allowable time limit.

To facilitate with the understanding of the ensuing second embodiment described, the disclosure of AU 03/00457 can be considered to be incorporated herein by reference.

Figure 3:
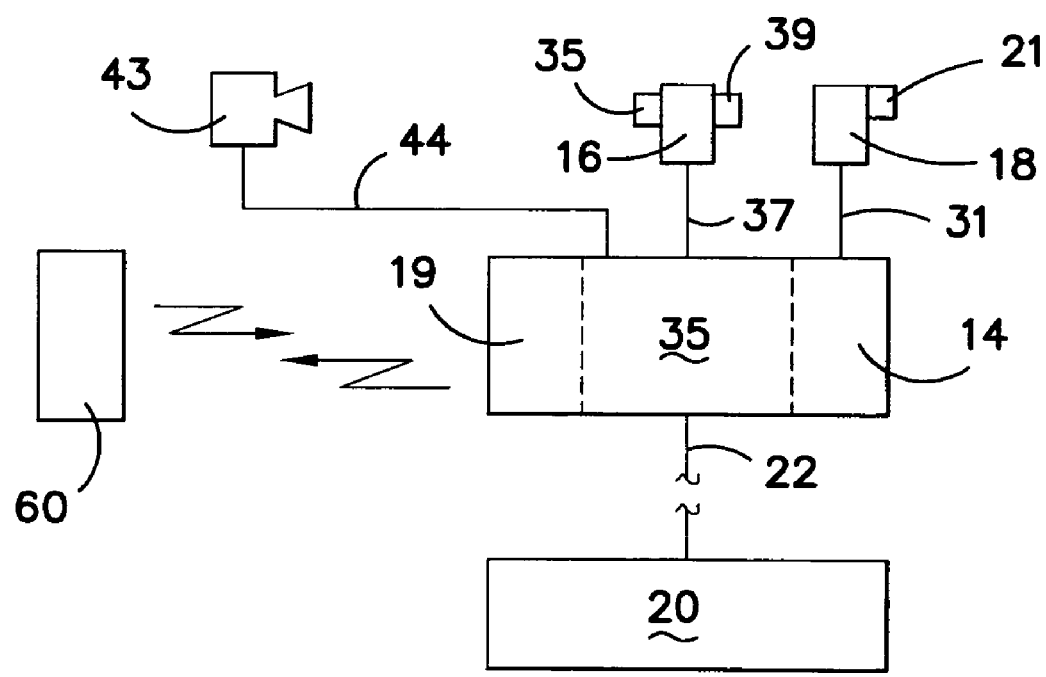
FIG. 3 is a block diagram of a parking system used for regulating parking in a car park according to a second embodiment of the present invention.

According to a second embodiment of the present invention, there is provided a parking system for parking a vehicle in a car park as shown in FIG. 3. The parking area regulated by the parking system of the first embodiment was a parking bay whereas, in the present embodiment, the parking area is the car park comprising a plurality of parking spaces in which the vehicle may be parked.

The parking system allows a user to communicate with a control station 25 by way of a mobile telephone 60 in a similar manner described in the first embodiment. A communication means 19 is provided for transmitting and receiving messages to and from the mobile telephone 60 respectively. A timer means 14, which is a processing section, is also provided for establishing when pre-determined time conditions are met. The control station 25 controls an entry barrier 16 into the car park, and an exit barrier 18 from the car park. These barriers are typically boom gates.

When the user wishes to park in the car park, the user makes a telephone call to the control station 25 using their mobile telephone 60. The entry barrier is then removed allowing the user to enter the car park and an account is established. The account is linked to details including the time in which the user entered the car park and the user's mobile telephone number. A time balance is subsequently calculated and the user is charged a fee when exiting the car park which generally corresponds to the amount of time in which the user is parked within the car park. In contrast to metered parking, the account time balance increases over time.

The user makes a second telephone call to the control station 25 when they wish to leave the car park. The fee to be charged can therefore be calculated using the standard rate by the time difference between the time the first call was made when entering the car park and the time the second call was made when leaving. Payment can be made using the mobile telephone 60.

According to a first example of the second embodiment of the present invention, a user parks their vehicle in the car park at 9 am on Sunday the $6^{th}$ of July. A pre-determined time condition enforced by the parking system is met when the time of day is within a fixed period of on hour before the car park closes for the day which, for the present example, is 9 pm. When this pre-determined time condition is met (i.e. the time of day is 8 pm) and the vehicle remains parked in the parking bay, the communication means 19 sends a reminder message to the mobile telephone 60 alerting the user to the fact that the car park will soon close. Failure to remove the user's vehicle before 9 pm will result in the user's vehicle being locked in the car park overnight.

Another pre-determined time condition enforced by the parking system is met when the vehicle has been parked in the car park for a time greater than a fixed period of one week. In the event that the user does not retrieve their vehicle within a week wherein the vehicle is still parked in the car park at 9 am on Sunday the $11^{th}$ of July, this pre-determined time condition is met. When this pre-determined time condition is met and the vehicle remains parked in the parking bay, the communication means 19 sends a reminder message to the mobile telephone 60 alerting the user that they have 1 day to remove their vehicle before it is towed away.

Additional variations and embodiments of the present invention will be apparent to a person skilled in the art. For example, the mobile telephone 10 of the preferred embodiments could alternatively be a pager or other like wireless receiver linked to the account and able to receive messages from the communication means.

The first embodiment of the present invention describes a parking system including a meter 10 and a central station 50. A person skilled in the art would appreciate that in an alternative embodiment, the functionality of the central station 50 could be incorporated into the meter 10 which already includes both the timer means and communication means. Alternatively, the timer means could be distributed between the central station 50 and meter 10 wherein a central clock synchronises the time for each parking meter 10. This latter arrangement would be particularly useful if the central station 50 was permanently connected to the meter 10 via the public switched telephone network (PSTN).

In addition, the first embodiment is directed to a parking system wherein the user communicates to a central station 50 using their mobile telephone 60 via the parking meter 10. In an alternative embodiment of the present invention, the mobile telephone 60 can directly connect to an analogous communication means located in the central station 50 which, in turn, is connected to a remote parking meter 10 via a wireless communication link. The user can thereby connect to the parking meter 10 using the mobile telephone 60 via the central station 50.

The second example of the first embodiment of the present invention could readily include the situation wherein, instead of the parking bay changing from having a maximum allowable time limit to a clearway, the bay changes from having a first maximum allowable time limit to a second maximum allowable time limit. In this instance, the legitimacy of the parking could be affected if, for example, a vehicle has been parked in a bay for 3 hours and the maximum allowable time limit changes from a first limit of 4 hours to a second limit of 2 hours. After the change, the user could be sent a reminder message indicating that the limit has changed and they are illegally parked.

The second embodiment described a car park whereby the account time balance increases over time, however, a person skilled in the art would understand that a user account with a time balance decreasing over time could equally be established when a fee is initially paid, as was the case in the first embodiment. In such an instance, pre-determined time conditions of the first embodiment may apply and analogous reminder messages could be sent to the user. The present invention would also have utility for a parking system similar to the first embodiment where the vehicle is locked in a parking bay until payment is made, and the time balance increases over time as was the case in the second embodiment.

The embodiments describe a flat fee or rate of charge, however, a person skilled in the art would appreciate that this rate may be varied in accordance with the time of day. Similarly the fixed periods described are for the purposes of example only and could be readily altered.

The foregoing additional variations and embodiments should be considered to fall within the scope of the present invention being claimed.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A parking system comprising:
    a parking meter for location in close proximity to a corresponding parking bay in which a user's vehicle is able to be parked;
    a payment receiving means for receiving payment and thereafter establishing a parking period in which the vehicle is able to be legitimately parked in the bay;
    a communication means for sending a message to the user's mobile phone prior to the expiry of the parking period, said message alerting the user that the parking period will soon expire and that the user must either move the vehicle before the expiry of the parking period or make an additional payment, if allowable, to remain legitimately parked.

2. A parking system as claimed in claim 1 wherein said payment receiving means comprises at least one of:
    a coin receipt means for accepting coinage;
    a note receipt means for accepting notes;
    a card reader for receiving credit card or smart card payments; and/or
    a receiver for receiving a mobile telephone call wherein the user can pay electronically using the mobile telephone.

3. A parking system as claimed in claim 2 wherein said payment receiving means comprises:
    a coin receipt means for accepting coinage;
    a note receipt means for accepting bank notes;
    a card reader for receiving credit card or smart card payments; and a receiver for receiving a telephone call whereafter the user can pay electronically using a telephone.

4. A parking system as claimed in claim 1 wherein the payment receiving means is provided by the parking meter.

5. A parking system as claimed in claim 1 wherein the parking meter has an input pad for entering a user's mobile telephone number.

6. A parking system as claimed in claim 5 wherein the input pad is a keypad or a touch screen display.

7. A parking system as claimed in claim 1 wherein the communication means is located in the parking meter and, in use, is connected to a remote central station via a wireless link.

8. A parking system as claimed in claim 1 wherein the communication means is located at a remote location and, in use, is connected to the parking meter via a wireless link.

9. A parking system as claimed in claim 1 wherein the parking system includes a processor for:
  storing a mobile telephone number provided by the user;
  calculating the parking period based on the payment received; and
  compiling the message to be sent.

10. A parking system as claimed in claim 9 wherein compiling the message involves retrieving a message and the user's mobile telephone number from a storage medium.

11. A parking system as claimed in claim 1 wherein the message is a short text message (SMS) message.

12. A parking system for sending messages to a receiver via a wireless communication link comprising:
  a timer means for establishing when a pre-determined time condition is met for a user's vehicle parked within a parking area regulated by said parking system, said user having an account which is linked to said receiver; and
  a communication means for sending a message to said receiver when said pre-determined time condition is met and said user's vehicle remains parked within said parking area.

13. A parking system as claimed in claim 12 wherein said parking area is a parking bay in which said vehicle can park, said parking bay being in close proximity to a corresponding parking meter.

14. A parking system as claimed in claim 13 wherein once said user has paid a fee for parking said vehicle, said account has a credited time balance which decreases over time, and said pre-determined time condition is when said time balance remaining is less than a fixed period before expiry.

15. A parking system as claimed in claim 14 wherein said receiver is a transceiver and upon receipt of said message by said transceiver, said user can send a return message to said communication means for increasing said time balance of said account.

16. A parking system as claimed in claim 13 wherein said pre-determined time condition is when said vehicle has been parked in said parking bay for greater than a fixed period, said fixed period being before the expiration of a maximum allowable time limit.

17. A parking system as claimed in claim 13 wherein said pre-determined time condition is when the time of day is within a fixed period before a pending change in a maximum allowable time limit for parking said vehicle in said parking bay, said change being related to the time of day.

18. A parking system as claimed in claim 12 wherein said receiver is a mobile telephone and said account has a record of said mobile telephone's number thereby linking said account to said mobile telephone.

19. A parking system as claimed in claim 18 wherein said message is a pre-recorded voice message or short message service (SMS) message.

20. A parking system as claimed in claim 12 wherein said parking area is a car park comprising a plurality of parking spaces in which said vehicle can park.

21. A parking system as claimed in claim 20 wherein said pre-determined time condition is when the time of day is within a fixed period before said car park closes for the day.

22. A parking system as claimed in claim 20 wherein said pre-determined time condition when said vehicle has been parked in said car park for a time greater than a fixed period.

23. A parking system comprising:
  a central facility which can be contacted by a user wishing to park by way of a telephone call to enable valid parking to take place; and
  a communication means at the central facility for sending a message to the user's mobile phone prior to the expiry of the parking period, said message alerting the user that the parking period will soon expire.

24. A system according to claim 23 wherein the communication means forms part of the central facility.

25. The system of claim 24 wherein the central facility attends to payment for parking by way of debiting a credit card or telephone account associated with the user.

26. The system of claim 24 where the system includes a parking meter and payment is made by the user at a payment receiving means associated with the meter.

27. A parking method comprising:
  providing a central facility which can be telephoned by a user to enable valid parking to take place;
  receiving a telephone call at the central facility from the user to initiate legal parking for a predetermined time period; and
  forwarding a message from the central facility to the user's telephone to alert the user that parking time will soon expire.

28. A method according to claim 27 wherein the communication means forms part of the central facility.

29. The method of claim 28 wherein the central facility attends to payment for parking by way of debiting a credit card or telephone account associated with the user.

30. The method of claim 29 wherein the method includes a parking meter and payment is made by the user at a payment receiving means associated with the meter.

* * * * *